No. 733,129. PATENTED JULY 7, 1903.
D. D. BERRY.
STOVE OR RANGE.
APPLICATION FILED NOV. 3, 1902.
NO MODEL. 2 SHEETS—SHEET 1.

Witnesses
Alfred W. Ticker
M. S. Irion

Inventor
Daniel D. Berry
by Higdon & Longan Attys.

No. 733,129. PATENTED JULY 7, 1903.
D. D. BERRY.
STOVE OR RANGE.
APPLICATION FILED NOV. 3, 1902.
NO MODEL. 2 SHEETS—SHEET 2.

Witnesses
Alfred A. Eicks
M. L. Orion

Inventor
Daniel D. Berry
by Higdon & Longan attys.

No. 733,129. Patented July 7, 1903.

UNITED STATES PATENT OFFICE.

DANIEL D. BERRY, OF SPRINGFIELD, MISSOURI.

STOVE OR RANGE.

SPECIFICATION forming part of Letters Patent No. 733,129, dated July 7, 1903.

Application filed November 3, 1902. Serial No. 129,959. (No model.)

*To all whom it may concern:*

Be it known that I, DANIEL D. BERRY, of the city of Springfield, Greene county, State of Missouri, have invented certain new and useful Improvements in Stoves or Ranges, of which the following is a full, clear, and exact description, reference being had to the accompanying drawings, forming a part hereof.

My invention relates to improvements in cook-stoves, and has for its object to provide for the equable distribution of heat in the oven and the deflection of portions of the heated air to different portions of the top of the stove as desired.

My invention consists in the peculiar construction and arrangement of parts hereinafter described and claimed and which will be more readily understood by reference to the accompanying drawings, which form part of this specification, and in which—

Figure 1:
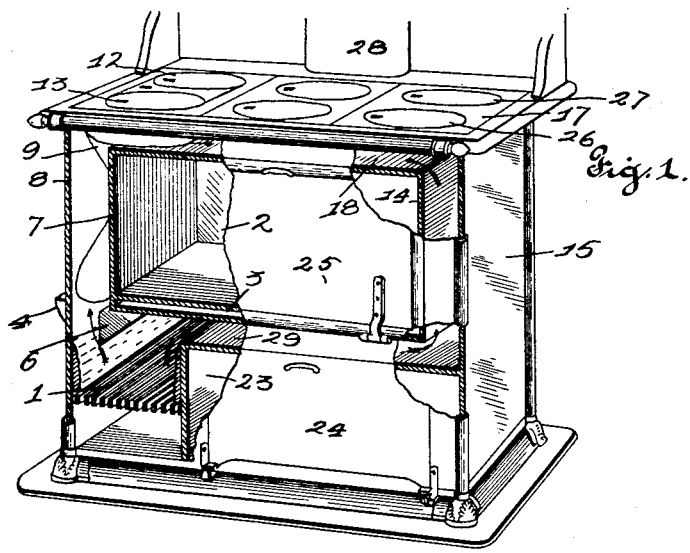
Figure 2:
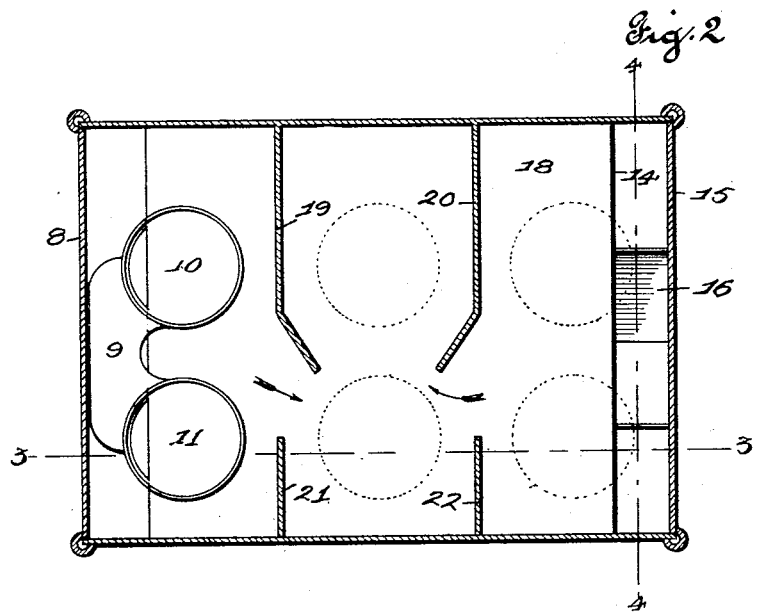
Figure 3:
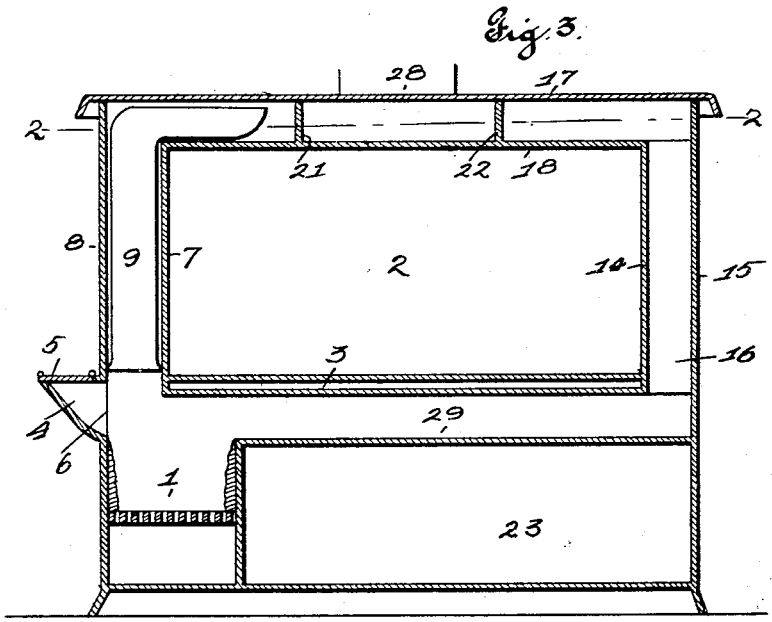
Figure 4:
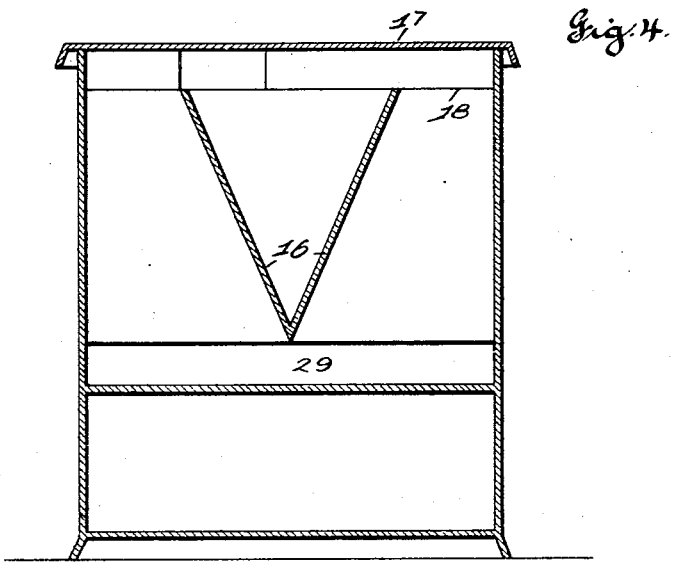
Figure 5:
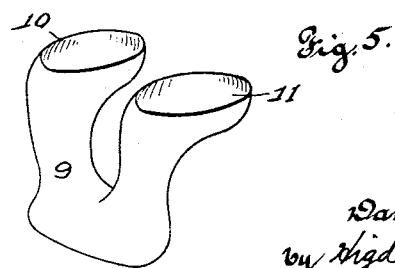

Figure 1 is a perspective view of a stove embodying my invention, showing parts broken away. Fig. 2 is a cross-section of the same, taken on the line 2 2 of Fig. 3. Fig. 3 is a vertical longitudinal section taken on the line 3 3 of Fig. 2. Fig. 4 is a vertical cross-section taken on the line 4 4 of Fig. 2. Fig. 5 is a detail of construction.

My invention embodies a fire-box 1, located beneath one end of the oven 2, which is provided with the double bottom 3. Access to the fire-box is secured through the projection 4, which is provided with the lid 5 and which communicates with the fire-box through the opening 6. The end wall 7 of the oven 2 is parallel with the end wall 8, and the intervening space is occupied by the twin flue 9, which terminates at its upper extremities in the openings 10 and 11, which are immediately under the holes 12 and 13. The end wall 14 of the oven 2 is parallel to the end wall 15, and the intervening space is divided by the V-shaped member 16. The stove-top 17 is parallel to the oven-top 18 and is divided by the lateral partitions 19, 20, 21, and 22, arranged as shown in Fig. 2.

The stove is further provided with the warming-chamber 23, to which access is had by means of the door 24. The oven 2 is provided with the door 25.

By means of my arrangement of flues the heated air and products of combustion are carried from the fire-box 1 in the manner indicated by the arrows in Fig. 1, thus securing an equable distribution of heat about the oven 2, a powerful upward draft through the twin flues 9, through the holes 12 and 13, and a great volume of heat is carried through the opposite flue formed by the member 16 to the holes 26 and 27. The products of combustion finally pass upward through the pipe 28.

A great economy of fuel is effected by locating the fire-box 1 directly beneath the end of the oven 2. Economy is further secured by the heat being directed through the holes 26 and 27, through the lateral flue 29, thus giving direct draft, which serves to heat the end of the oven farthest from the fire-box.

In the stove of my invention there is no downward draft; but the flues are so arranged that the heat always follows its natural and upward course.

Having thus described my invention, what I claim as new, and desire to have secured to me by the grant of Letters Patent, is—

In a cook-stove, an oven provided with a double bottom, a fire-box located beneath one end of the oven, a lateral flue extending from the fire-box under the full length of the oven, a twin flue leading vertically from the fire-box to the top of the stove, a V-shaped flue between the oven and the top wall at the end farthest from the fire-box, a lateral space between the top of the oven and the top of the stove divided by transverse partitions into transverse flues, and a warming-chamber extending from the side of the fire-box to the opposite end of the stove and divided from the oven by the lower lateral flue, substantially as and for the purposes specified.

In testimony whereof I affix my signature in presence of two witnesses.

DANIEL D. BERRY.

Witnesses:
ALFRED A. EICKS,
M. G. IRION.